G. D. BANTA.
TIRE MOUNTING OR DISMOUNTING MACHINE.
APPLICATION FILED JULY 14, 1919.
1,437,085.
Patented Nov. 28, 1922.
2 SHEETS—SHEET 1.
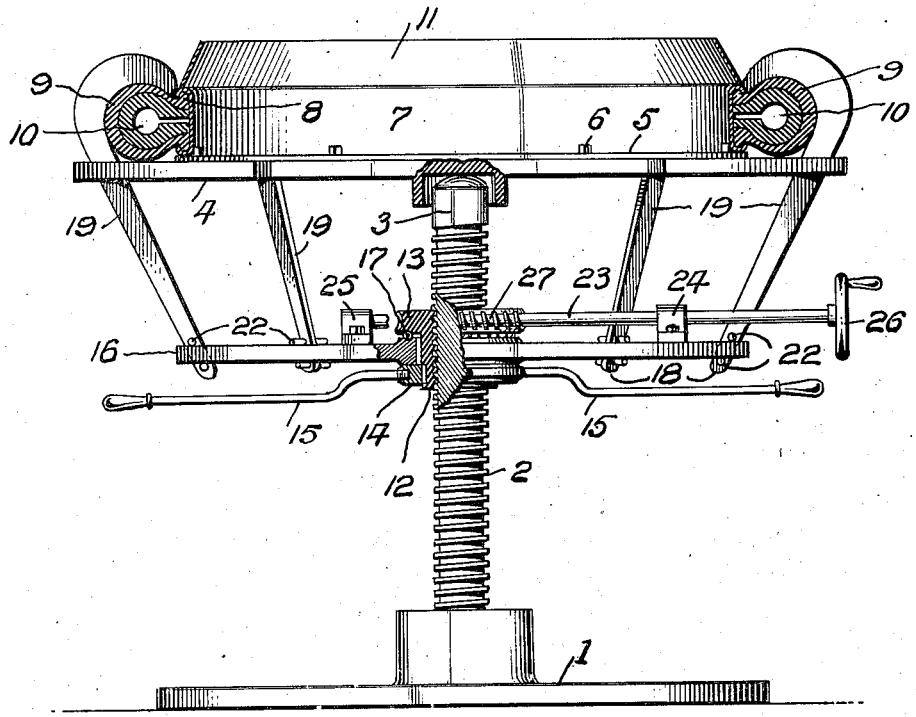
Fig. 1.
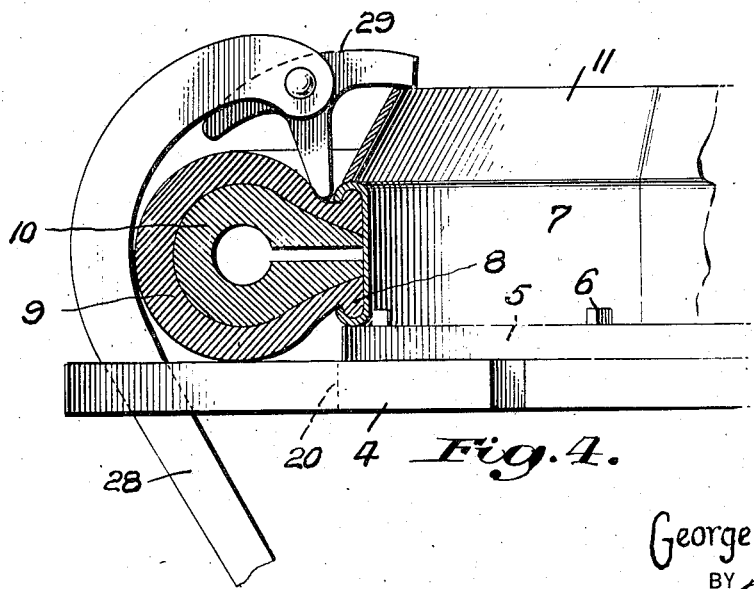
Fig. 4.
INVENTOR
George D. Banta,
BY
ATTORNEYS

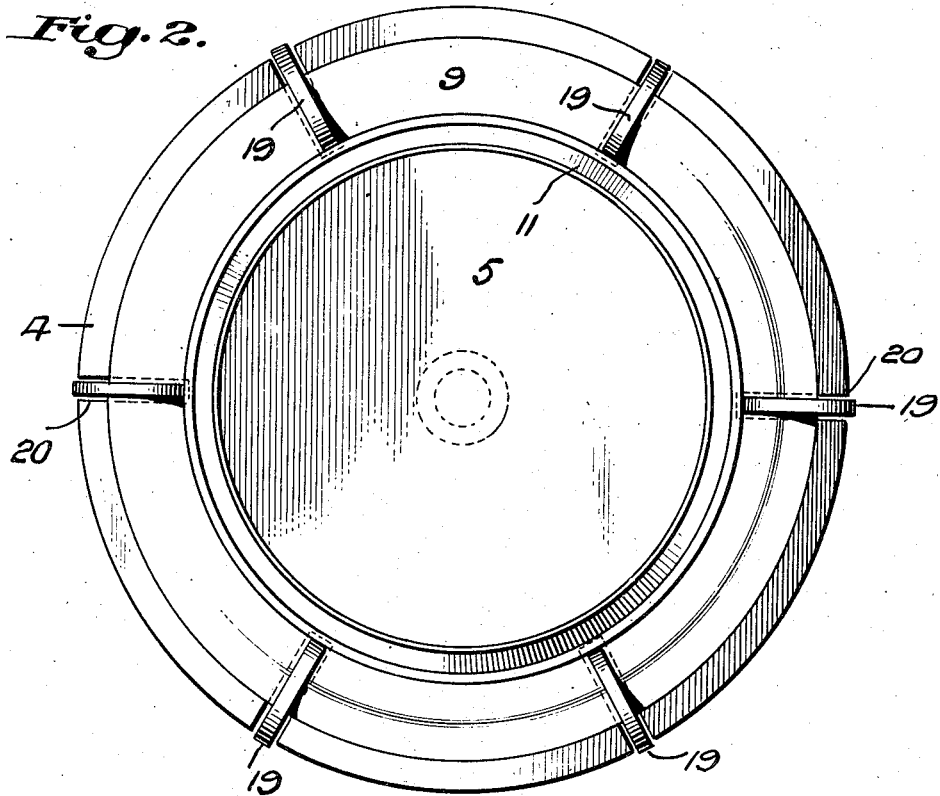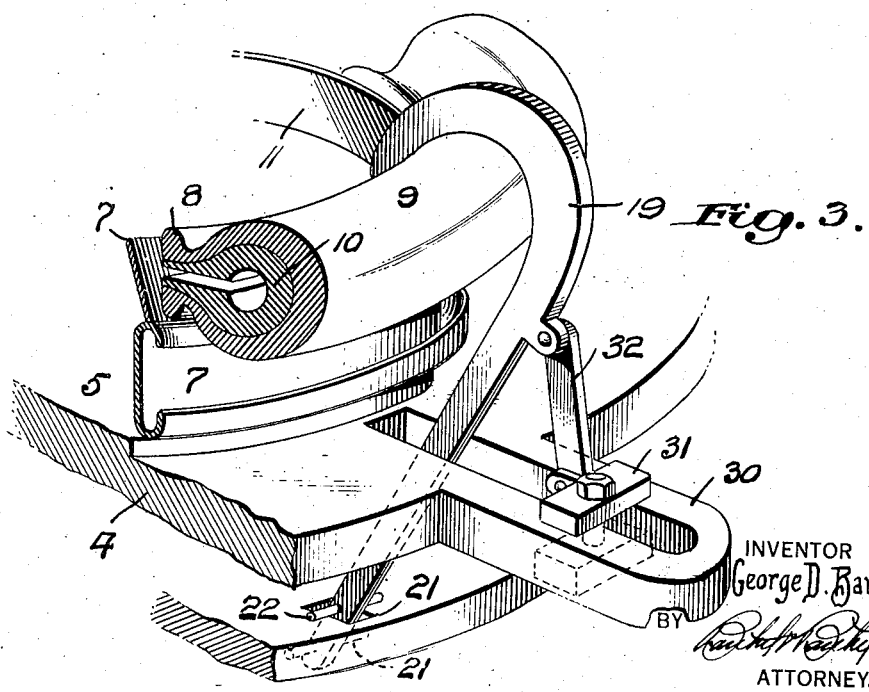

Patented Nov. 28, 1922.

1,437,085

UNITED STATES PATENT OFFICE.

GEORGE D. BANTA, OF DETROIT, MICHIGAN.

TIRE MOUNTING OR DISMOUNTING MACHINE.

Application filed July 14, 1919. Serial No. 310,679.

*To all whom it may concern:*

Be it known that I, GEORGE D. BANTA, a citizen of the United States of America, residing at Detroit, in the county of Wayne and State of Michigan, have invented certain new and useful Improvements in Tire Mounting or Dismounting Machines, of which the following is a specification, reference being had therein to the accompanying drawings.

Some vehicle tires of the non-pneumatic type have heavy resilient filler members within the outer casings thereof and on account of the resilient nature of these filler members it is an extremely difficult operation to place a tire having such a filler member on a rim and it is almost as difficult to remove the same. At present, it is practically impossible to mount or dismount such a tire, relative to a rim, without the aid of a machine, and my invention relates to a novel machine that may be employed for expeditiously and economically mounting and dismounting a tire relative to its rim.

My invention aims to provide a machine of the above character that may be operated by hand or motive power for properly placing a tire on its rim or stripping the tire from its rim. The machine is primarily designed for placing a tire on its rim and includes novel means for compressing an outer casing about its filler member, so that the clincher edges of the outer casing may readily enter a rim. As considerable pressure is necessary for such an operation, the machine has been constructed so as to withstand rough usage and permit of the mounting and dismounting of a tire, relative to its rim, to be safely and quickly performed.

The machine will be hereinafter specifically described and then claimed, and reference will now be had to the drawings, wherein Figure 1 is a side elevation of the machine, partly broken away and partly in section;

Fig. 2 is a plan of the machine;

Fig. 3 is a perspective view of a portion of the machine, and

Fig. 4 is a detail sectional view of a portion of the machine, illustrating a slight modification of my invention.

In the drawings, the reference numeral 1 denotes a suitable base having a central stationary screw or pedestal 2 with the upper end thereof terminating in a head 3. Loosely mounted on the head 3 so as to have a wobbling or self adjusting movement, relative to said head is a platform 4 preferably circular, with a central raised portion 5 provided with positioning lugs or pegs 6, which are set in from the marginal edges of the raised portion 5, so as to receive a rim 7. The rim 7 may be properly held at the marginal edges of the raised portion 5 to receive the clencher edges 8 of an outer casing 9 adapted to contain a filler member 10. The outer casing 9 is of a conventional form and the filler member 10 is of the well known character now on the market and adapted to be used in lieu of a pneumatic inner tube, the filler member possessing a degree of resiliency that will maintain the outer casing 9 normally distended, and yet permit of the outer casing yielding to a certain degree when in use. The nature of the filler member 10 is such that considerable difficulty is experienced and labor required to mount the clencher edges 8 of the outer casing 9 in the rim 7, and at times considerable pressure is required for mounting and dismounting.

On the rim 7 is placed a guide ring 11, which tapers outwardly from its upper edges to its lower edges so as to form an annular incline or wedge member on which the tire may be placed, as shown in Figs. 2 and 3.

Adjustable on the screw or pedestal 2 is a nut 12 having its upper end provided with a worm wheel 13, and its lower end in a fixed hub 14 having handle bars 15. The elements 14 and 15 constitute a large hand wheel fixed relative to the nut 12 so that the nut may be manually revolved and raised and lowered on the screw or pedestal 2. Surrounding the nut 12, between the hand wheel hub 14 and the worm wheel 13 is a table 16 with suitably disposed anti-frictional bearing 17 so that the table may remain stationary during a rotary movement of the nut 12.

The table 16 is preferably circular in plan and loosely connected to the peripheral edges thereof are the lower ends 18 of a plurality of hook members 19 extending upwardly through slots 20 in the peripheral edges of the platform 4, so that the hook members may engage over the outer casing 9 of the tire. The manner of connecting the lower ends 18 of the hook members 19 to the table 16 is such that said hook members will be held somewhat upright for engagement and disengagement with the tire, and as shown in Figs. 1 and 3, the table 16 may have openings 21 for the lower ends 18 of the hook members 19, and said hook members provided with upper and lower transverse pins 22. These pins will support the hook members relative to the table and permit of the upper ends of said hook member being swung in a lateral direction so as to be easily placed in engagement with the tire or removed therefrom.

On the table 16 is power means for raising and lowering said table, and as shown in Fig. 1, said power means consists of a shaft 23 in bearings 24 and 25 on the table 16, and said shaft may be driven by a motor or from any suitable source of power but has been shown as having a hand wheel 26. The shaft also has a worm 27 meshing with the worm wheel 13, and when the shaft 23 is revolved the nut 12 may be easily and quickly raised or lowered, carrying with it the table 16. The shaft 23 may be constructively arranged so that it may be reciprocated relative to the bearings 24 and 25 to move the worm 27 out of mesh with the worm wheel 13 and thus permit of the hand wheel, represented by the elements 14 and 15, being used to adjust the table 16 independent of the power means.

The large horizontal hand wheel may be swung around to raise the table 16, and position the hook members 19 whereby said members can be swung over the tire, as shown in Fig. 2. Then by applying hand or motive power to the shaft 23, the nut 12 may be lowered to lower the table 16 and cause the hook members 19 to force the tire downwardly off of the guide ring 11 in position within the rim 7. Some manual manipulation of the tire may be necessary during this operation, but to entirely avoid any guidance or manual manipulation of the tire there is shown in Fig. 4 a hook member 28 that may be substituted for the hook member 19 to accomplish two operations in connection with the tire. Pivotally connected to the upper end of the hook member 28 is a bell crank 29 and this bell crank is held so that it may cooperate with the hook member 28 in forcing the tire downwardly off of the guide ring 11 and into the rim 7. If the tire is forced downwardly, the bell crank 29 impinges against the upper edge of the guide ring 11, causing said bell crank to be tilted, and that end of the bell crank engaging the outer casing 9 of the tire forces the upper clencher edge 8 of the tire into the rim 7, so that the tire will be properly seated and held within the rim.

As shown in Fig. 3, the platform 4 may have slotted extensions 30 integrally formed or detachable relative to said platform and in these slotted extensions are adjustable supports 31 connected to the hook members 19 by links or toggles 32. It is possible to set the supports 31 so that besides the hook members having a downward movement, said hook members will travel inwardly and thus cause a tire to be properly manipulated for seating in its rim.

In some instances the upper ends of the hook members 19 may be provided with shoes to prevent said hook members from cutting the outer casing 9 of the tire and at the same time obtain a better purchase on said tire.

To dismount a tire, it is only necessary to elevate the rim 7 relative to the platform 4 and this may be accomplished by providing a suitable spacer member or support between the platform 4 and the rim 7, so that there will be sufficient clearance between the tire and the platform to permit of said tire being pulled downwardly by the hook members 19 and stripped from the rim. In some instances the guide ring 11 may be inverted and used for this purpose.

It is thought that the operation and utility of the machine will be apparent without further description, and while in the drawings there are illustrated the preferred embodiments of my invention, it is to be understood that the structural elements are susceptible to such variations and modifications as fall within the scope of the appended claims.

What I claim is:—

1. In a tire mounting machine wherein a tire casing is provided with a filler member and one side of said casing and filler member are adapted to be pressed to enter a rim, the combination of a platform adapted to hold the rim, a guide ring adapted to be placed on the rim to guide a tire on to the rim, a stationary pedestal supporting said platform so that said platform may wobble and seek its own level when pressure is brought to bear on the tire, an adjustable table on said pedestal, tire engaging members moved by said table and adapted to force the tire downwardly on and into the rim, and means carried by said tire engaging members for forcing the clencher edge of the tire into the rim.

2. A machine of the type described comprising rim supporting means, tire guiding means, tire engaging members adapted to force a tire from said tire guiding means on to a rim, and means carried by the tire engaging members adapted to engage said tire guiding means and force the clencher edge of the tire into the rim.

3. In a tire mounting machine wherein a tire is adapted to be adjusted relative to a rim, means for making such adjustment, said means comprising a screw pedestal, a platform loosely mounted on the upper end of said pedestal for supporting the rim, a nut adjustable on the screw pedestal, a table loosely held on said nut, tire engaging members having the lower ends thereof connected to the marginal edges of said table and the upper ends thereof the marginal edges of said platform and adapted to engage the tire and force it on to the rim, and means carried by said table adapted for adjusting said nut for raising and lowering said table.

In testimony whereof I affix my signature in the presence of two witnesses.

GEORGE D. BANTA.

Witnesses:—
KARL H. BUTLER,
ANNA M. DORR.